United States Patent [19]

Kamita

[11] Patent Number: 5,040,667

[45] Date of Patent: Aug. 20, 1991

[54] VARIABLE-SPEED PALLET CONVEYOR

[75] Inventor: Hisamitsu Kamita, Osaka, Japan

[73] Assignee: Kamita Equipment Engineering Co., Ltd., Osaka, Japan

[21] Appl. No.: 484,861

[22] Filed: Feb. 27, 1990

[30] Foreign Application Priority Data

Mar. 2, 1989 [JP] Japan .................................. 1-51315
Feb. 1, 1990 [JP] Japan .................................. 2-24639

[51] Int. Cl.⁵ .......................................... B65G 17/24
[52] U.S. Cl. .................................... 198/779; 198/792
[58] Field of Search ............... 198/465.1, 465.2, 465.3, 198/779, 792, 803.01, 803.2

[56] References Cited

U.S. PATENT DOCUMENTS 2,762,496 9/1956 McCaul .............................. 198/779
3,406,810 10/1968 Blair et al. .......................... 198/779
3,527,087 9/1970 Converse et al. ................. 198/465.2
3,690,433 9/1972 Buldini ............................... 198/779

FOREIGN PATENT DOCUMENTS 96767 12/1983 European Pat. Off. ........... 198/779

Primary Examiner—Joseph E. Valenza
Attorney, Agent, or Firm—Wenderoth, Lind & Ponack

[57] ABSTRACT

A variable-speed pallet conveyor has a moving body, a plurality of rotary shafts rotatably mounted on the moving body so as to extend horizontally and transversely of the direction of travel, tapered rollers and pallet feed rollers fixedly mounted on the rotary shafts, and rails laid under the path of the tapered rollers to support them. Pallets are supported by the pallet feed rollers. The travel speed of the pallets can be changed by changing the position of the rails along the axis of the tapered rollers. There may be provided rail-missing areas so that the pallets can be stopped in this area.

20 Claims, 2 Drawing Sheets

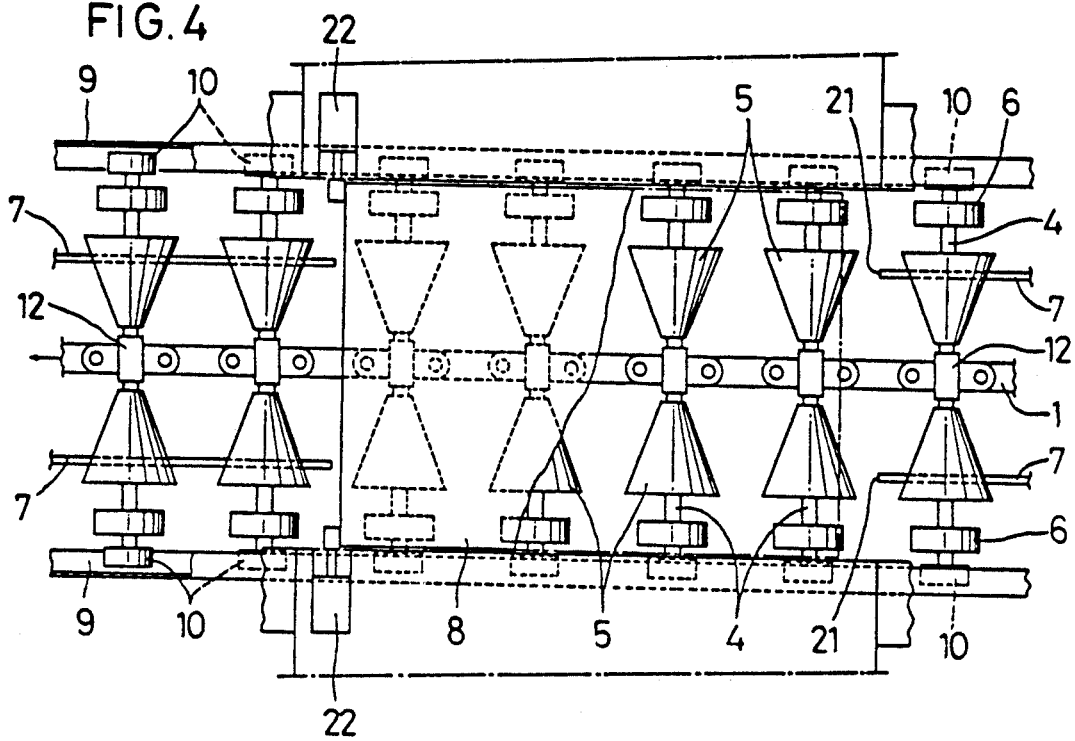
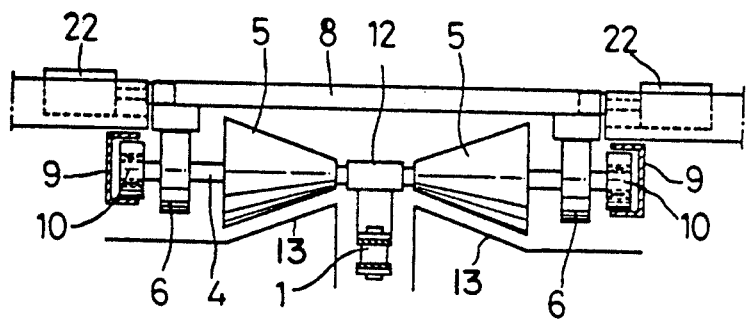
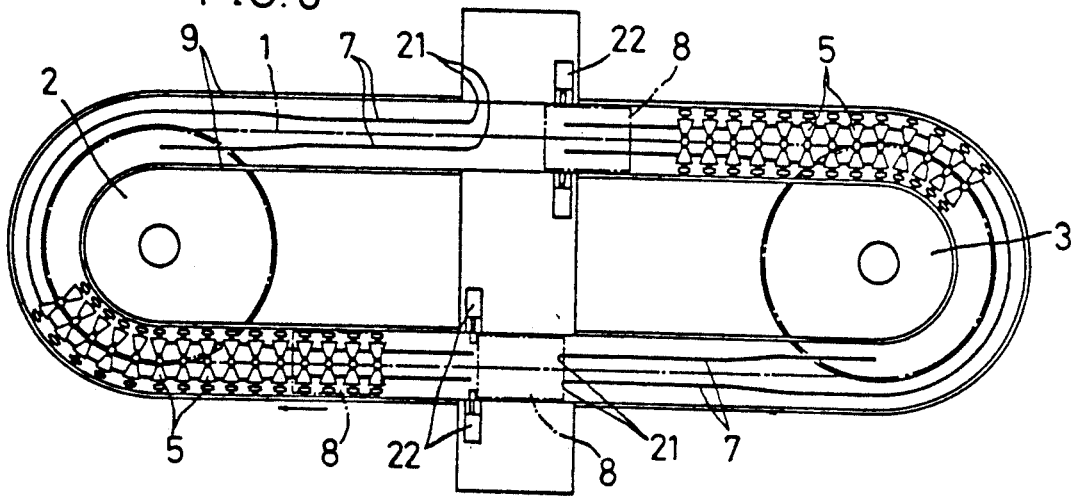

VARIABLE-SPEED PALLET CONVEYOR

BACKGROUND OF THE INVENTION

This invention relates to a variable-speed pallet conveyor and more specifically a pallet conveyor capable of changing the travelling speed of a pallet or stopping it at any desired point of a conveyor line.

Various types of conveyors have been proposed to transport various kinds of materials. But it has heretofore been a standard concept to keep constant the line speed of a conveyor over the entire length of the line. Thus it was impossible to change the line speed at a given point of the line or to partially stop the line during transportation.

SUMMARY OF THE INVENTION

It is an object of the present invention to provide a variable-speed pallet conveyor which is capable of feeding pallets at predetermined different speeds when the pallets are passing different points, and which is capable of stopping the pallets or moving them in the opposite direction at any given point.

In accordance with the present invention, there is provided a variable-speed pallet conveyor for feeding pallets, comprising a moving body and a plurality of rotary shafts rotatably mounted on the moving body so as to extend horizontally and transversely to the direction of travel. Tapered rollers are and pallet feed rollers fixedly mounted on the rotary shafts, and the pallet feed rollers are adapted to support the pallets. Rails laid under the path of the tapered rollers support the tapered rollers.

The pallets are supported on the pallet feed rollers of the rotary shafts mounted on the moving body. The tapered rollers are supported on the rails, which bear the load from the pallets and the weights of the moving body, the rotary shafts and the like.

When the moving body is moving, the tapered rollers rotate by the friction with the rails and the pallet feed rollers rotate together with the tapered rollers. The pallets are moved in the direction of travel of the moving body by the rotation of the pallet feed rollers.

The rotating speed of the tapered rollers is inversely proportional to the diameter of its portions in contact with the rails. The rotation of the tapered rollers is transmitted to the pallet feed rollers. Thus if the rails are in contact with the tapered rollers at their small diameter side, the pallets are moved at a higher speed, whereas if the rails are in contact with the tapered rollers at their large-diameter side, they are moved more slowly.

When the tapered rollers come to rail-missing area, no torque is given to the tapered rollers. Thus the pallets can be stopped.

The structure according to the present invention can be used not only for cargo loading but also for carrying passengers. In that case, the conveyor is sped down during boarding and unboarding of passengers and is sped up to a desired speed to carry them. For example it can be used for carrying people in large-scale facilities and exhibition sites, to carry people through a designated route, and as an auxiliary urban transit system.

Also, since the speed of the pallet at any given point of the line can be freely set the pallet speed in each step on the line, as well as the time required for the step, can be set to optimum values. An area for acceleration may be provided in the line to shorten the transportation time, and thus to reduce the number of pallets used.

BRIEF DESCRIPTION OF THE DRAWINGS

Other features and objects of the present invention will become apparent from the following description taken with reference to the accompanying drawings, in which:

FIG. 4 is a plan view of a portion of a second embodiment;

FIG. 5 is a vertical sectional front view of the same; and

FIG. 6 is an entire plan view of the same.

DETAILED DESCRIPTION OF THE PREFERRED EMBODIMENTS

Figure 1:
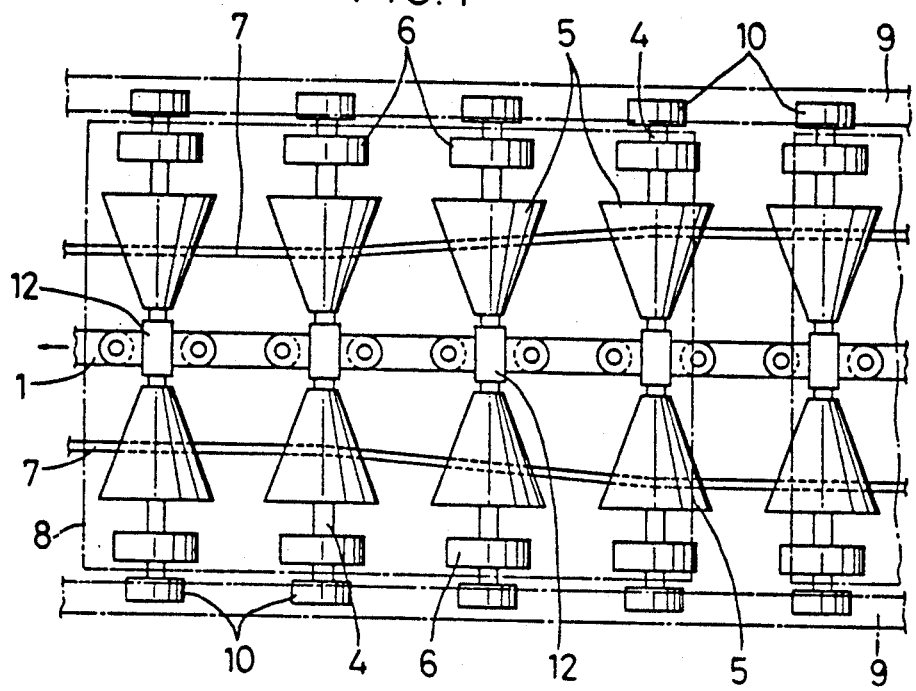
FIG. 1 is a plan view of a portion of a first embodiment of the variable-speed pallet conveyor according to the present invention.
Figure 2:
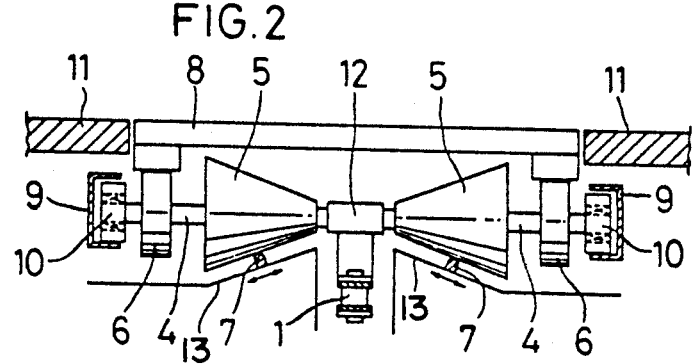
FIG. 2 is a vertical sectional front view of the same.
Figure 3:
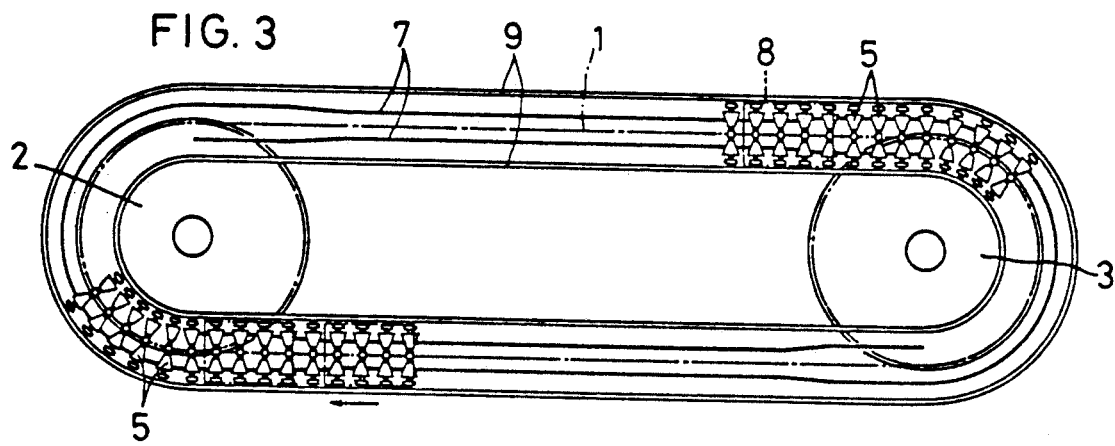
FIG. 3 is an entire plan view of the same.

In the first embodiment shown in FIGS. 1 to 3, a moving body 1 for driving is in the form of an endless chain arranged to run on a horizontal plane around and between sprockets 2 and 3.

A plurality of rotary shafts 4 are mounted on the upper part of the moving body 1. As shown in FIGS. 1 and 2, they are arranged horizontally at equal intervals and are rotatably supported by holders 12 so as to extend perpendicularly to the direction of travel of the moving body 1 and protrude at both sides of the moving body 1.

Each rotary shaft 4 is provided at both sides of the moving body 1 with tapered rollers 5 and pallet feed rollers 6 arranged in symmetrical relation with respect to the moving body 1. Rails 7 for supporting the tapered rollers 5 are provided thereunder so as to extend in the direction of travel. Fixed support surfaces 13 support the rails 7.

Each pallet 8 is flat and has such a width as to be supported by a pair of pallet feed rollers 6 at both sides thereof and has such a length as to be supported by a plurality of pairs of pallet feed rollers 6. As shown in FIG. 2, each pallet 8 is supported horizontally on the pallet feed rollers 6 so as to be moved in the direction of travel of the moving body 1 as the pallet feed rollers 6 turn.

The positions at which the tapered rollers 5 and the pallet feed rollers 6 are mounted on the rotary shafts 4 should be determined according to the shape of the pallets 8.

The rails 7 serve to bear, through the tapered rollers 5, the load on the pallets 8 and the weights of the moving body 1, the rotary shafts 4, the tapered rollers 5 and the pallet feed rollers 6. When the rotary shafts 4 move together with the moving body 1, the tapered rollers 5 will move while turning by friction with the rails 7. The rotation of the tapered rollers 5 is transmitted to the pallet feed rollers 6 through the rotary shafts 4, rotating the pallet feed rollers 6. Thus the pallet 8 moves at a speed equal to the sum of the travel speed of the moving body 1 and the rotating speed of the pallet feed rollers 6.

Since the rotating speed of the tapered rollers 5 is inversely proportional to its diameter at the portion in contact with the rails 7, the travel speed of the pallet 8 can be freely changed by changing the position of the rails 7 on the support surfaces 13.

Namely, when the rails 7 are arranged so as to come into contact with the tapered rollers at their small-diameter side, the tapered rollers 5 will rotate at an increased speed and thus the pallet 8 will move at a higher speed.

In contrast, if the rails 7 are laid so as to contact the tapered rollers 5 at their large-diameter side, their rotating speed, and thus the pallet speed, will be low.

Therefore, by changing the laying position of the rails 7, the travel speed of the pallet 8 can be changed freely.

FIG. 1 shows an arrangement of the rails 7 at a portion where the travel speed of the pallet 8 increases from low to high. The distance between the rails 7 is reducing gradually at the portion.

The rails 7 may be arranged in a fixed position so that the pallet 8 will travel at predetermined speeds when it is passing different zones or points. Otherwise as shown by arrows in FIG. 2, they may be arranged so that their transverse position can be adjusted. This makes it possible to change the travel speed of the pallet 8 if desired.

In order to prevent the meandering of the rotary shafts 4, which move together with the moving body 1, guide rails 9 may be provided at both ends of the rotary shafts 4 so as to extend in the direction of travel of the rotary shaft 4 to receive guide rollers 10 mounted on both ends of the rotary shafts 4 so as to roll in the guide rails 9. Also, guides 11 may be provided at both sides of the pallet 8 to prevent it from meandering.

Further, as shown in FIG. 3, at the portion where the moving body 1 turns, the rail 7 located inside of the curves should be omitted so that the pallets 8 can pass the curve smoothly.

In operation of the variable-speed pallet conveyor of the first embodiment, when the moving body 1 is moving at a constant speed with the pallets 8 placed on the pallet feed rollers 6, the tapered rollers 5 will rotate due to the friction by contact with the rails 7. The pallet feed rollers 6 will also rotate, moving the pallets 8 supported thereby in the direction of travel of the moving body 1. The travel speed of the pallets 8 changes according to the predetermined positioning of the rails 7. In other words, while the moving body 1 is driven at a constant speed, the pallets 8 will move at a speed predetermined for each position while they are passing different positions.

The distance between the adjacent pallets 8 should be set at zero when the travel speed of the pallets 8 is at its minimum. With this arrangement, when the travel speed increases, the distance between the pallets will increase, too, because the following pallets move in unison with the preceding pallets. When the travel speed which has risen to a given point begin to decrease, the distance will decrease, too. When the travel speed reaches its minimum, the distance will return to zero again.

FIGS. 4 to 6 show a second embodiment in which the pallets can be stopped at any desired position. The same parts as those in the first embodiments are represented by the same numerals, and their description is omitted.

In the second embodiment, there are provided areas 21 where the rails 7 are missing over a length at least longer than the whole length of the pallet 8 e.g. at loading and unloading positions, so that the pallet 8 can be stopped when it comes right over the rail-missing areas 21.

Stoppers 22 for stopping the transportation of the pallet 8 are provided over the rail-missing areas 21.

In operation of the second embodiment, when the tapered rollers 5 adapted to move together with the moving body 1 enter one of the rail-missing areas 21, no turning torque owing to the friction with the rails 7 is given to the tapered rollers 5. Thus the pallet feed rollers 6 and the pallet will stop.

Since the guide rollers 10 rotatably mounted on both ends of the rotary shafts 4 are supported by the guide rails 9, the pallets 8 can be kept in its horizontal position by the pallet feed rollers 6 even when the tapered rollers 5 are in the rail missing areas 21 and are free from support by the rails 7.

When the tapered rollers 5 are in the rail-missing areas 21, the pallet feed rollers 6 tend to move the pallet 8 at the same speed as the travel speed of the moving body 1 because the pallet 8 is supported thereon. But when the pallet 8 abuts the stoppers 22, the rollers 6 will be turned in the reverse direction by contact with the bottom surface of the pallet 8 so as to pass thereunder without slippage with respect to the pallet 8.

Since the pallet 8 can be held by the stoppers 22 in a fixed position when it is in one of the rail-missing areas 21, loading and unloading are easy. Further, while the pallet 8 is in one of the rail-missing areas 12, it can be moved in the opposite direction to the direction of travel of the moving body 1 by pushing it.

What is claimed is:

1. A variable-speed pallet conveyor of erfeeding pallets, comprising:
    an endless moving body having a direction of travel;
    a plurality of rotary shafts rotatably mounted on and supported by said endless moving body so as to extend horizontally and transversely to the direction of travel;
    a plurality of tapered drive rollers fixedly mounted on each said rotary shaft;
    pallet feed rollers fixedly mounted on said rotary shafts for supporting and feeding pallets; and
    a plurality of rails laid below said tapered drive rollers supporting said tapered drive rollers, said tapered drive rollers being driven in forced rotation by frictional contact with said plurality of rails.

2. The variable-speed pallet conveyor for feeding pallets as set forth in claim 1, wherein said plurality of rails are adjustable int he axial direction of said tapered rollers.

3. The variable-speed pallet conveyor for feeding pallets as set forth in claim 1, wherein said plurality of rails extend int he direction of travel of said endless moving body, said rails having gaps therealong for stopping forced rotation of said tapered drive rolled when said tapered drive rollers are at said gaps.

4. The variable-speed conveyor for feeding pallets as set forth in claim 1, wherein two said tapered drive rollers are fixedly mounted on each said rotary shaft, and two said pallet feed rollers are fixedly mounted on each said rotary shaft.

5. The variable-speed pallet conveyor for feeding pallets as set forth in claim 1, wherein said endless moving body is connected to said rotary shafts at midpoints thereof, and each said rotary shaft as a said tapered drive roller and said pallet feed roller on each side of its midpoint.

6. The variable-speed pallet conveyor for feeding pallets as set forth in claim 5, and further comprising:
    a guide roller on each end of said rotary shafts;
    a pair of guide rials disposed along said endless moving body receiving said guide rollers of said rotary shafts therein; and a pair of pallet guides disposed along said endless moving body on either side thereof and above said guide rails for guiding pallets therebetween.

7. The variable-speed pallet conveyor for feeding pallets as set forth in claim 6, and further comprising a plurality of pallets disposed on said pallet feed rollers between said pair of pallet guides.

8. The variable-speed pallet conveyor for feeding pallets as set forth in claim 5, and further comprising a plurality of pallets disposed on said pallet feed rollers, wherein said pallet feed rollers are fixedly mounted to said rotary shafts at the ends thereof, with said tapered drive rollers located between said pallet feed rollers of each said shaft, such that said pallets are supported at edge portions thereof.

9. The variable-speed pallet conveyor for feeding pallets as set forth in claim 4, and further comprising a fixed support for said rials disposed below said tapered drive rollers.

10. The variable-speed pallet conveyor for feeding pallets as set forth in claim 9, wherein said fixed support extends parallel to said tapered rive rollers and said rails are adjustable on said fixed support to change the speed of the forced rotation of said tapered drive rollers.

11. A variable-speed pallet conveyor for feeding pallets, comprising:
   an endless moving body having a direction of travel;
   a plurality of rotary shafts rotatably mounted on and supported by said endless moving body so as to extend horizontally and transversely to the direction of travel;
   tapered drive rollers fixedly mounted on each said rotary shaft;
   pallet feed rollers fixedly mounted on said rotary shafts for supporting and feeding pallets;
   fixed support surfaces extending along said endless moving body and below said tapered drive rollers; and
   a plurality of rials laid on said fixed support surfaces below said tapered drive rollers, said plurality of rails supporting said tapered drive rollers thereon, sand said tapered drive rollers being driven enforced rotation by frictional contact with said plurality of rails.

12. The variable-speed pallet conveyor for feeding pallets as set froth in claim 11, wherein said plurality of rails are adjustable in the axial direction of said tapered rollers.

13. The variable-speed pallet conveyor prior feeding pallets as set forth in claim 11, wherein said plurality of rails extend in the direction of travel of said endless moving body, said rails having gaps therealong for stopping forced rotation of said tapered drive rollers when said tapered drive rollers are at said gaps.

14. The variable-speed conveyor for feeding pallets as set forth in claim 11, wherein two said tapered drive rollers are fixedly mounted on each said rotary shaft, and two said pallet feed rollers are fixedly mounted on each said rotary shaft.

15. The variable-speed pallet conveyor for feeding pallets as set forth in claim 14, wherein said endless moving body is connected to said rotary shafts at midpoints thereof, and each said rotary shaft has a said tapered drive roller and a said pallet feed roller on each side of its midpoint.

16. The variable-speed pallet conveyor for feeding pallets as se froth in claim 15, and further comprising:
   a guide roller on each end of said rotary shafts;
   a pair of guide rails disposed along said endless moving body receiving said guide rollers of said rotary shafts therein; and
   a pair of pallet guides disposed along aid endless moving body on either side thereof and above said guide rials for guiding pallets therebetween.

17. The variable-speed pallet conveyor for feeding pallets as set forth in claim 16, and further comprising a plurality of pallets disposed on said pallet feed rollers between said pair of pallet guides.

18. The variable-speed pallet conveyor for feeding pallets as set forth in claim 15, and further comprising a plurality of pallets disposed on said pallet feed rollers, wherein said pallet feed rollers are fixedly mounted to said rotary shafts at the ends thereof, with said tapered drive rollers located between said pallet feed rollers of each said shaft, such that said pallet are supported at edge portions thereof.

19. The variable-speed pallet conveyor for feeding pallets as set forth in claim 11, wherein one said rail extends along the entire said endless moving body, and another said rail extends along the entire said endless moving body except at portions whereat said endless moving body forms a curve.

20. The variable-speed pallet conveyor for feeding pallets as set forth in claim 11, wherein one said rail extends along said endless moving body at least at portions whereat said endless moving body forms a curve.

* * * * *